United States Patent
Mergener et al.

(10) Patent No.: US 12,374,918 B2
(45) Date of Patent: *Jul. 29, 2025

(54) EXTERNALLY CONFIGURABLE WORKSITE POWER DISTRIBUTION BOX

(71) Applicant: MILWAUKEE ELECTRIC TOOL CORPORATION, Brookfield, WI (US)

(72) Inventors: Matthew J. Mergener, Mequon, WI (US); Jeremy R. Ebner, East Troy, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/635,222

(22) Filed: Apr. 15, 2024

(65) Prior Publication Data

US 2024/0348086 A1 Oct. 17, 2024

Related U.S. Application Data

(63) Continuation of application No. 17/815,093, filed on Jul. 26, 2022, now Pat. No. 11,962,149, which is a
(Continued)

(51) Int. Cl.
*H02B 1/52* (2006.01)
*B25F 5/00* (2006.01)
(Continued)

(52) U.S. Cl.
CPC .......... *H02J 13/00026* (2020.01); *B25F 5/00* (2013.01); *H02B 1/52* (2013.01);
(Continued)

(58) Field of Classification Search
None
See application file for complete search history.

(56) References Cited

U.S. PATENT DOCUMENTS

| 5,936,318 A | 8/1999 | Weiler et al. |
| 6,041,184 A | 3/2000 | Inoue et al. |

(Continued)

FOREIGN PATENT DOCUMENTS

| DE | 202006014606 | 1/2007 |
| WO | 2007010270 | 1/2007 |

OTHER PUBLICATIONS

United States Patent Office Action for U.S. Appl. No. 16/184,675, dated Jun. 6, 2019, 8 pages.
(Continued)

*Primary Examiner* — Jared Fureman
*Assistant Examiner* — Joel Barnett
(74) *Attorney, Agent, or Firm* — Michael Best & Friedrich LLP (57) ABSTRACT

Systems and methods for configuring, with an external device, a power distribution box having priority disconnects. The power distribution box includes a housing portion and a base portion elevating the housing portion. The power distribution box receives power from an external power source and distributes the power to a plurality of alternating current (AC) output receptacles. The power distribution box further includes an antenna and a power disconnect controller coupled to the antenna to communicate with and be configured by an external device, such as a smart phone, tablet, or laptop computer. Using the external device, a user can configure the priority level and mode of the AC output receptacles. In the case of high current, the power distribution box will disconnect receptacles in accordance with the priority level and mode configuration provided by the external device.

20 Claims, 8 Drawing Sheets

Related U.S. Application Data continuation of application No. 15/340,574, filed on Nov. 1, 2016, now Pat. No. 11,424,601.

(60) Provisional application No. 62/249,393, filed on Nov. 2, 2015.

(51) Int. Cl.
*H02B 7/06* (2006.01)
*H02J 3/14* (2006.01)
*H02J 13/00* (2006.01)

(52) U.S. Cl.
CPC .............. *H02B 7/06* (2013.01); *H02J 3/14* (2013.01); *H02J 13/00004* (2020.01); *H02J 13/00022* (2020.01); *H02J 13/00034* (2020.01); *H02J 2310/14* (2020.01); *Y02B 70/30* (2013.01); *Y02B 70/3225* (2013.01); *Y02B 90/20* (2013.01); *Y04S 20/222* (2013.01); *Y04S 20/242* (2013.01); *Y04S 40/126* (2013.01)

(56) References Cited

U.S. PATENT DOCUMENTS

| | | | |
|---|---|---|---|
| 6,211,581 B1 | 4/2001 | Farrant | |
| 7,362,232 B2 | 4/2008 | Holle et al. | |
| 8,005,465 B2 | 8/2011 | Salokannel et al. | |
| 8,054,211 B2 | 11/2011 | Vidal | |
| 8,410,633 B2 | 4/2013 | Batzler et al. | |
| 8,471,415 B1 | 6/2013 | Heinwolf | |
| 8,674,823 B1 | 3/2014 | Contario et al. | |
| 8,811,295 B2 | 8/2014 | Bhar | |
| 9,007,186 B1 | 4/2015 | Krummey et al. | |
| 9,106,099 B2 | 8/2015 | Gelonese | |
| 9,219,361 B1 | 12/2015 | Wine et al. | |
| 10,158,213 B2 | 12/2018 | Burch | |
| 11,962,149 B2* | 4/2024 | Mergener | H02J 13/00034 |
| 2004/0095237 A1 | 5/2004 | Chen et al. | |
| 2005/0136989 A1 | 6/2005 | Dove | |
| 2005/0207081 A1 | 9/2005 | Mng | |
| 2006/0017950 A1 | 1/2006 | Ikegami et al. | |
| 2006/0176630 A1 | 8/2006 | Carlino et al. | |
| 2006/0187023 A1 | 8/2006 | Iwamura | |
| 2007/0198748 A1 | 8/2007 | Ametsitsi et al. | |
| 2008/0114997 A1 | 5/2008 | Chin | |
| 2008/0309164 A1 | 12/2008 | Lim | |
| 2009/0058185 A1 | 3/2009 | Schoettle | |
| 2009/0121846 A1 | 5/2009 | Rye et al. | |
| 2009/0195970 A1 | 8/2009 | Lee et al. | |
| 2009/0207924 A1 | 8/2009 | Chan | |
| 2009/0268380 A1 | 10/2009 | Brown et al. | |
| 2010/0122257 A1 | 5/2010 | Wada | |
| 2010/0145542 A1* | 6/2010 | Chapel | H02J 3/14 700/295 |
| 2010/0225167 A1 | 9/2010 | Stair et al. | |
| 2010/0226391 A1 | 9/2010 | Miyazaki et al. | |
| 2010/0271226 A1 | 10/2010 | Holbery | |
| 2010/0289333 A1 | 11/2010 | Gilpatrick | |
| 2010/0305769 A1 | 12/2010 | Jones et al. | |
| 2011/0015795 A1 | 1/2011 | Boyer et al. | |
| 2011/0179188 A1 | 7/2011 | Nakagawa et al. | |
| 2011/0199196 A1 | 8/2011 | Shin | |
| 2011/0292869 A1 | 12/2011 | Krieter | |
| 2011/0320828 A1 | 12/2011 | Boss et al. | |
| 2012/0019207 A1* | 1/2012 | Kuo | H01R 25/003 320/111 |
| 2012/0092811 A1 | 4/2012 | Chapel et al. | |
| 2012/0150359 A1 | 6/2012 | Westergaard | |
| 2012/0173033 A1 | 7/2012 | Tischer | |
| 2012/0212332 A1 | 8/2012 | Schubert | |
| 2012/0307700 A1 | 12/2012 | Nordberg et al. | |
| 2013/0073060 A1* | 3/2013 | Dawley | H02J 13/00016 700/20 |
| 2013/0109375 A1 | 5/2013 | Zeiler et al. | |
| 2013/0124882 A1 | 5/2013 | Clarke | |
| 2013/0245849 A1 | 9/2013 | Paul et al. | |
| 2013/0338844 A1 | 12/2013 | Chan et al. | |
| 2014/0001977 A1 | 1/2014 | Zacharchuk et al. | |
| 2014/0068027 A1 | 3/2014 | Flacco et al. | |
| 2014/0240125 A1 | 8/2014 | Burch et al. | |
| 2014/0240902 A1* | 8/2014 | Burch | H02B 11/26 361/622 |
| 2014/0316594 A1 | 10/2014 | Steele et al. | |
| 2015/0011174 A1 | 1/2015 | Kameda | |
| 2015/0066227 A1 | 3/2015 | Chapel et al. | |
| 2016/0099565 A1 | 4/2016 | Tseng et al. | |
| 2017/0047771 A1 | 2/2017 | Motsenbocker | |
| 2017/0048783 A1 | 2/2017 | Savolainen | |
| 2018/0042091 A1 | 2/2018 | De Menezes et al. | |

OTHER PUBLICATIONS

United States Patent Office Action for U.S. Appl. No. 16/184,675 dated Oct. 4, 2019 (22 pages).

Merriam-Webster, definition of "Mode," retrieved Jun. 20, 2021, 4 pages.

* cited by examiner

EXTERNALLY CONFIGURABLE WORKSITE POWER DISTRIBUTION BOX

RELATED APPLICATIONS

This application is a continuation of U.S. patent application Ser. No. 17/815,093, filed Jul. 26, 2022, which is a continuation of U.S. patent application Ser. No. 15/340,574, filed Nov. 1, 2016, which claims priority to U.S. Provisional Patent Application No. 62/249,393, filed on Nov. 2, 2015, the entire content of each of which is hereby incorporated by reference.

FIELD OF THE INVENTION

The invention relates to systems and methods for distributing power at a worksite.

BACKGROUND

Temporary power systems distribute power at worksites, such as construction projects, where permanent power is not available. For instance, in constructing a building, an on-site generator may generate power for use by construction workers for powering various tools and items, such as power drills, saws, radios, computers, lighting, etc. Alternatively, a temporary connection to a power utility grid may be used.

SUMMARY

In one embodiment, a method for configuring a power distribution box is provided. The method includes establishing, by the power distribution box, a wireless communication link with an external setting device and receiving, over the wireless communication link from the external setting device, disconnect configuration data for a plurality of outlet circuits of the power distribution box. The method further includes configuring the power distribution box by setting a priority level for each of the plurality of outlet circuits in accordance with the disconnect configuration data. The method also includes receiving, at a power input of the power distribution box, alternating current (AC) power from an external power source and distributing the AC power received from the external power source to the plurality of outlet circuits in accordance with the disconnect configuration data.

In another embodiment, another method for configuring a power distribution box is provided. The method includes establishing, by an external setting device, a wireless communication link with the power distribution box. On a screen of the external setting device, a configuration screen for the power distribution box is provided. The method further includes receiving user input specifying new disconnect configuration data. The new disconnect configuration data includes a priority level for each of a plurality of outlet circuits of the power distribution box. The new disconnect configuration data is transmitted to the power distribution box to configure the power distribution box.

In another embodiment, a power distribution box operable to be configured is provided. The power distribution box includes a housing portion and a base portion elevating the housing portion above a surface on which the power distribution box is placed. The power distribution box also includes a power source input operable to receive power from an external power source and a plurality of outlet circuits electrically coupled to the power source input. Additionally, the power distribution box includes an antenna and a power disconnect controller. The power disconnect controller is coupled to the antenna and is configured to establish a wireless communication link with an external setting device. The power disconnect controller is also configured to receive, over the wireless communication link, disconnect configuration data. The power disconnect controller has priority levels assigned to the plurality of outlet circuits as specified by the disconnect configuration data received from the external setting device.

Embodiments of the invention involve configuring a power distribution box having priority disconnects and used to distribute temporary power. Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible. For example, "controllers" described in the specification can include standard processing components, such as one or more processors, one or more computer-readable medium modules, one or more input/output interfaces, and various connections (e.g., a system bus) connecting the components.

Figure 1:
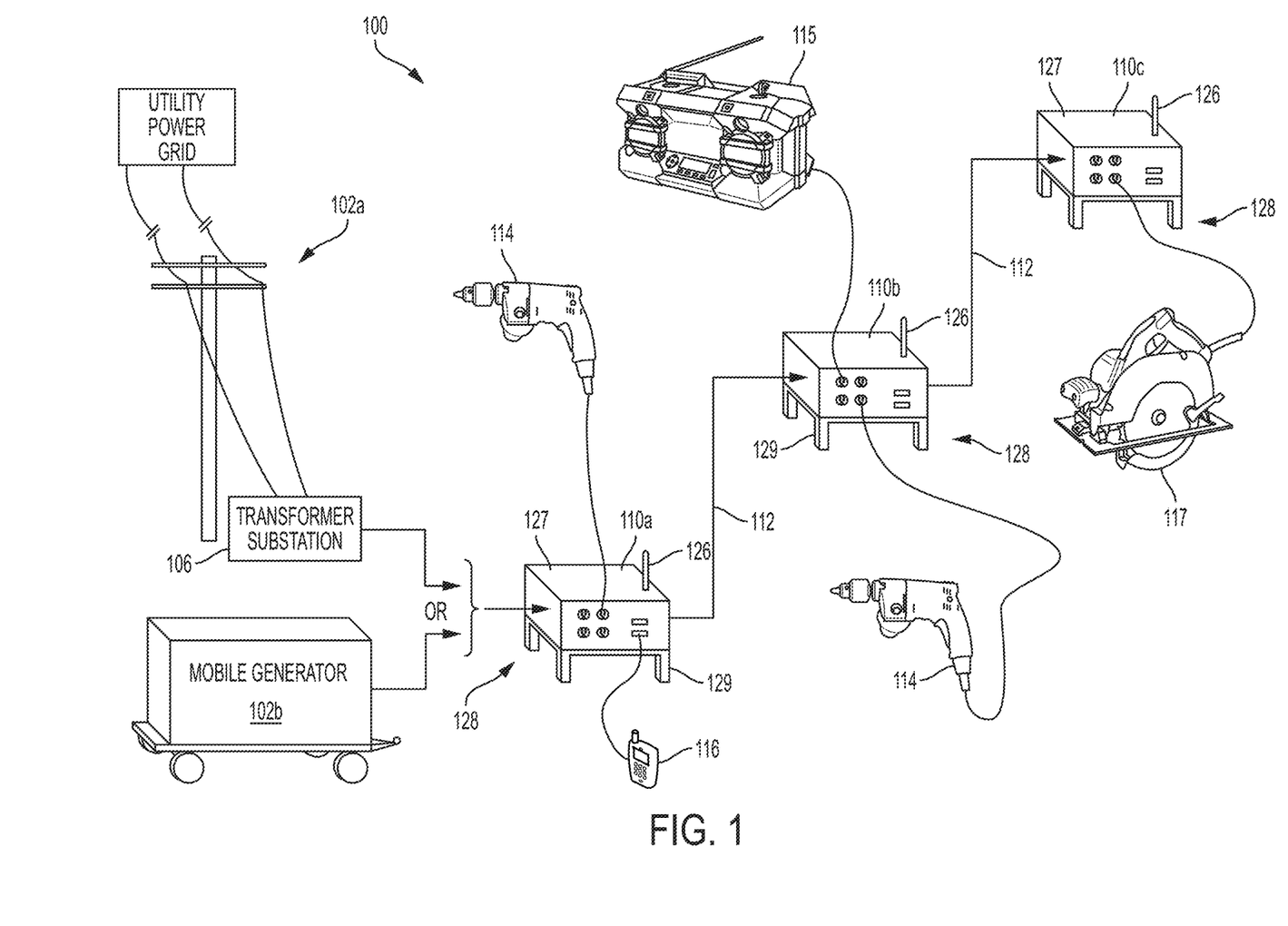
FIG. 1 illustrates a temporary power distribution system according to embodiments of the invention.

FIG. 1 illustrates an exemplary temporary power distribution system 100. The system 100 includes a power source, such as one or both of a utility grid power source 102a and a mobile generator power source 102b (generically referred to as the power source 102). One of the utility grid power source 102a and the mobile generator 102b is generally operating, while the other is either not present in the system 100 or on standby. In some instances, the mobile generator 102b acts as a backup power source in case of a power outage of the utility grid power source 102a.

The utility grid power source 102a is coupled to a local transformer substation 106 and provides a 50 Ampere (A), 440 volt, alternating current (VAC) power supply. The substation 106 transforms the input power to one or more 50 A, 120 VAC power supply lines, one of which is provided to the power distribution box ("power box") 110a. In some instances, the substation 106 is considered part of the utility grid power source 102a. The mobile generator 102b is also operable to output a 50 A, 120 VAC output to the power box 110a. The power box 110a receives the output of the power source 102 at an input receptacle, which is electrically coupled to an output receptacle of a power box 110a. A daisy chain cable 112 is coupled to the output receptacle of the power box 110a and to an input receptacle of a power box 110b. A power box 110c is similarly coupled by a daisy chain cable 112 to the power box 110b. Thus, the output of the power source 102 is shared among each of the power boxes 110a-c, which are generically referred to as the power boxes 110. In some instances, the substation 106 and/or mobile generator 102b output multiple 50 A, 120 VAC outputs, each connected to a separate power box 110 or string of power boxes 110.

The power boxes 110 distribute the received power to various outlets on each respective power box 110. For example, each of the power boxes 110 illustrated in FIG. 1 include four 120 VAC outlets and two 5 volt, direct current (VDC) USB® type outlets, each powered by the power received at the input receptacle from the power source 102. At a worksite, various tools and other electronic devices may be coupled to the outlets of the power boxes 110. For instance, the power boxes 110 are coupled to one or more of an electric drill/driver 114 (120 VAC), a worksite radio 115 (120 VAC), a smart phone 116 (5 VDC); and a circular saw 117 (120 VAC).

Although not shown in detail, one or more of the output receptacles may include cables and receptacles with twist-to-lock/unlock mechanisms for securing cables to the power boxes 110. Additionally, the output receptacles may be recessed and include water-tight, hinged covers to prevent water ingress near the conductive elements. Alternative embodiments of the invention include different power, current, and voltage levels, different current thresholds, different numbers of output receptacles, and different types of output receptacles.

The particular voltage levels of power lines described in this application are exemplary and approximate. For instance, the substation 106 may provide a single 240 VAC supply line to the power boxes 110, or two 120 VAC supplies lines that are combined to form a 240 VAC supply line. In such instances, the power boxes 110 may also include one or more 240 VAC outlets in addition to the 120 VAC outlets and 5 VDC USB® outlets. Additionally, the particular values are approximate and may vary in practice. For instance, the 120 VAC line may be nearer to about 110 VAC, and the 240 VAC supply line may be nearer to about 220 VAC. Furthermore, the power boxes 110 are illustrated and described herein as having common U.S.-style outlets and voltage levels. However, the power boxes 110 may be adapted for use with other outlet types and voltage levels, such as those common in Japan, Great Britain, Russia, Germany, etc.

The power boxes 110 further include an antenna 126 positioned on a housing 127. The housing 127 includes a base 128 to elevate the power boxes 110 above the ground, e.g., by 2 to 18 inches. The housing 127 may have a ruggedized construction including plastic and/or metal to withstand impacts, dropping, harsh weather, moisture, and other common wear and tear that occurs on a worksite. The base 128 includes legs 129. The base 128, housing 127, and legs 129 may be integral components or components that are secured to one another, e.g., via fasteners, welding, adhesive, etc. The elevation provided by the base 128 maintains the power boxes 110 out of water, dirt, contaminants, and hazardous materials that may be found on the ground of a worksite and that may pose issues to the power boxes 110 and safety risks.

Figure 2:
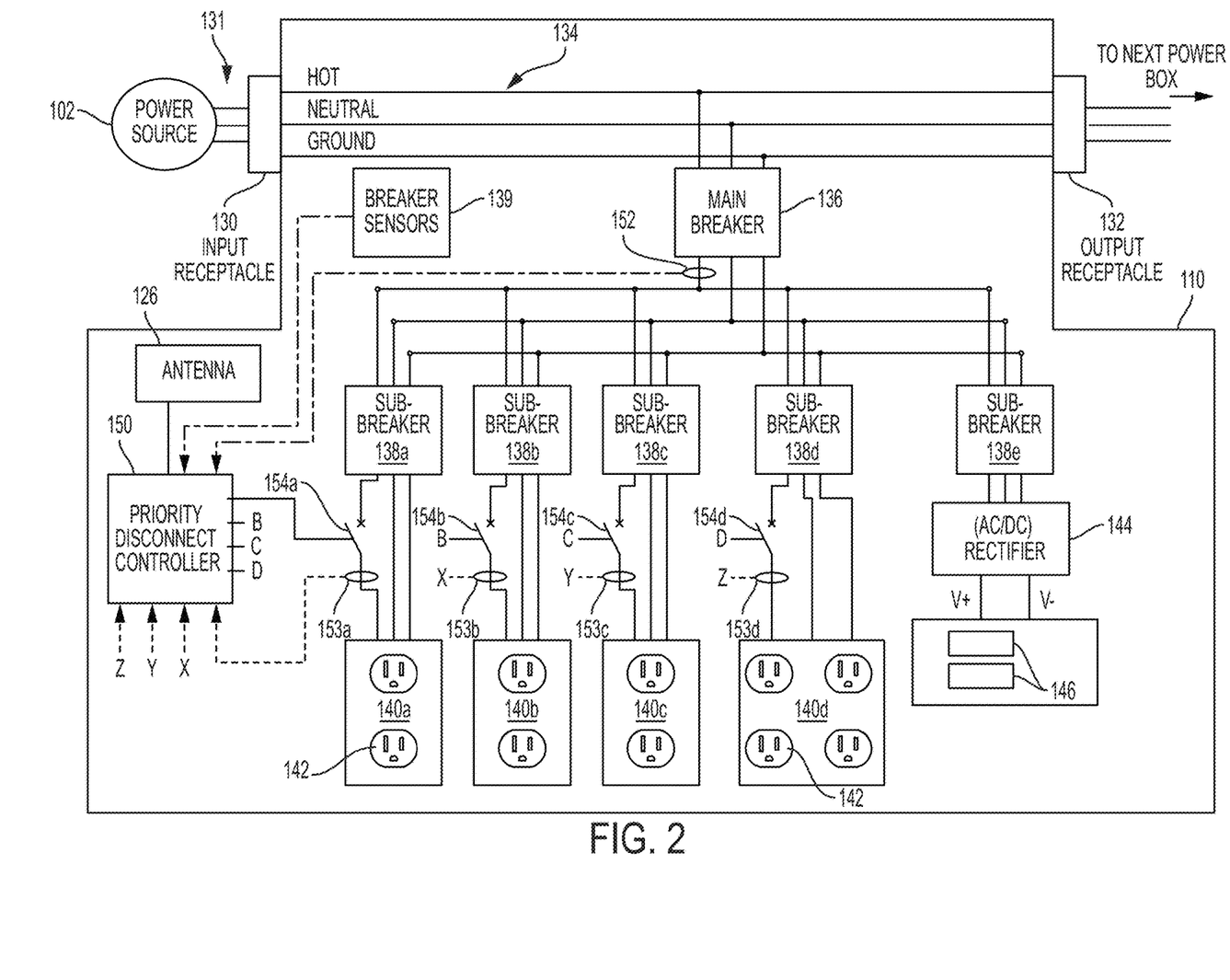
FIG. 2 illustrates a diagram of a power box having a priority disconnect module and antenna.

FIG. 2 illustrates the power box 110 in greater detail. As described above, the power box 110 includes an input receptacle 130 for receiving a 50 A, 120 VAC power supply line 131 from the power source 102. The input receptacle 130 is electrically coupled to the output receptacle 132 via power lines 134, which may then be coupled to another power box 110 via a daisy chain cable 112. The power lines 134 include a hot, neutral, and ground line, which are coupled to a main circuit breaker 136. The main breaker 136 is a "slow-blow" breaker that selectively opens when the current level drawn downstream of the main breaker 136 exceeds a predetermined threshold, such as 20 A or 25 A, for a certain amount of time, such as 100 milliseconds (ms). When opened, the main breaker 136 severs the electrical connections between the power lines 134 and the sub-breakers 138. The main breaker 136 may be manually reset by a user to re-connect the power lines 134 to the downstream components, such as by flipping a toggle switch.

An output side of the main breaker 136 is coupled to several sub-breakers 138a-e, which are generically referred to as the sub-breakers 138. The sub-breakers 138 are similar to the main breaker 136 in function and may have the same predetermined threshold as the main breaker 136, or a predetermined threshold that is lower than the main breaker 136, such as 15 A or 20 A. The power box 110 further includes one or more breaker sensors 139 to detect the state of each of the main breaker 136 and the sub-breakers 138a-e, which may be either in a closed state or an open/tripped state. Each of the sub-breakers 138a-d is coupled to a respective outlet circuit 140a-d, each of which includes one or more 120 VAC output receptacles 142. Each output receptacle 142 may be a ground fault circuit interrupter (GFCI) circuit for further safety, and may include a test and reset button (not shown). Sub-breaker 138e is coupled to a rectifier 144 for converting the 120 VAC to 5 VDC for providing to two direct current (DC) outlets 146, such as USB® outlets.

The power box 110 further includes a priority disconnect controller ("PD controller") 150. The PD controller 150 is coupled to the breaker sensors 139, which provide an indication of the states of the main breaker 136 and the sub-breakers 138a-e to the PD controller 150. The PD controller 150 is further coupled to a current sensor 152 that monitors the current drawn by the sum of the components of the power box 110 downstream from the main breaker 136, including the current drawn via each of the outlet circuits 140a-d and DC outlets 146. Although not shown, the PD controller 150 and other non-illustrated circuits of the power box 110 are also powered by the power lines 134 via the main breaker 136.

The PD controller 150 is further coupled to current sensors 153a, 153b, 153c, and 153d and to disconnect switches 154a, 154b, 154c, and 154d. The PD controller 150 is operable to monitor the current drawn on the circuits of each of the sub-breakers 138a-d. For instance, the current sensor 153a indicates the current drawn by the two receptacles 142 of the outlet circuit 140a. In some instances, a further current sensor and disconnect switch are provided for the DC outlet circuit of the sub-breaker 138c.

The PD controller 150 is also operable to control disconnect switches 154a-d to selectively open and close. When a disconnect switch (e.g., switch 154a) is opened, the associated one of the outlet circuits 140a-d becomes an open circuit that no longer conducts electricity to power a device plugged into one of the receptacles 142 of the associated one of the outlet circuits 140a-d.

The PD controller 150 selectively opens and closes the disconnect switches 154a-d dependent on a disconnect configuration of the PD controller 150 and outputs of the current sensors 153a-d received by the PD controller 150. The disconnect configuration may define various current thresholds, a mode for each outlet circuit, and a priority level for each outlet circuit. For instance, the PD controller 150 offers individual circuit protection for each of the outlet circuits 140a-d based on an individual circuit current threshold, which is generally set to trigger before the associated breaker 138a-d. For example, assuming the sub-breaker 138a opens when current exceeds 15 A for 100 ms, the PD controller 150 may selectively open the outlet circuit 140a when it exceeds an individual circuit current threshold of 14.5 A for 75 ms or 15 A for 50 ms.

Figure 3:
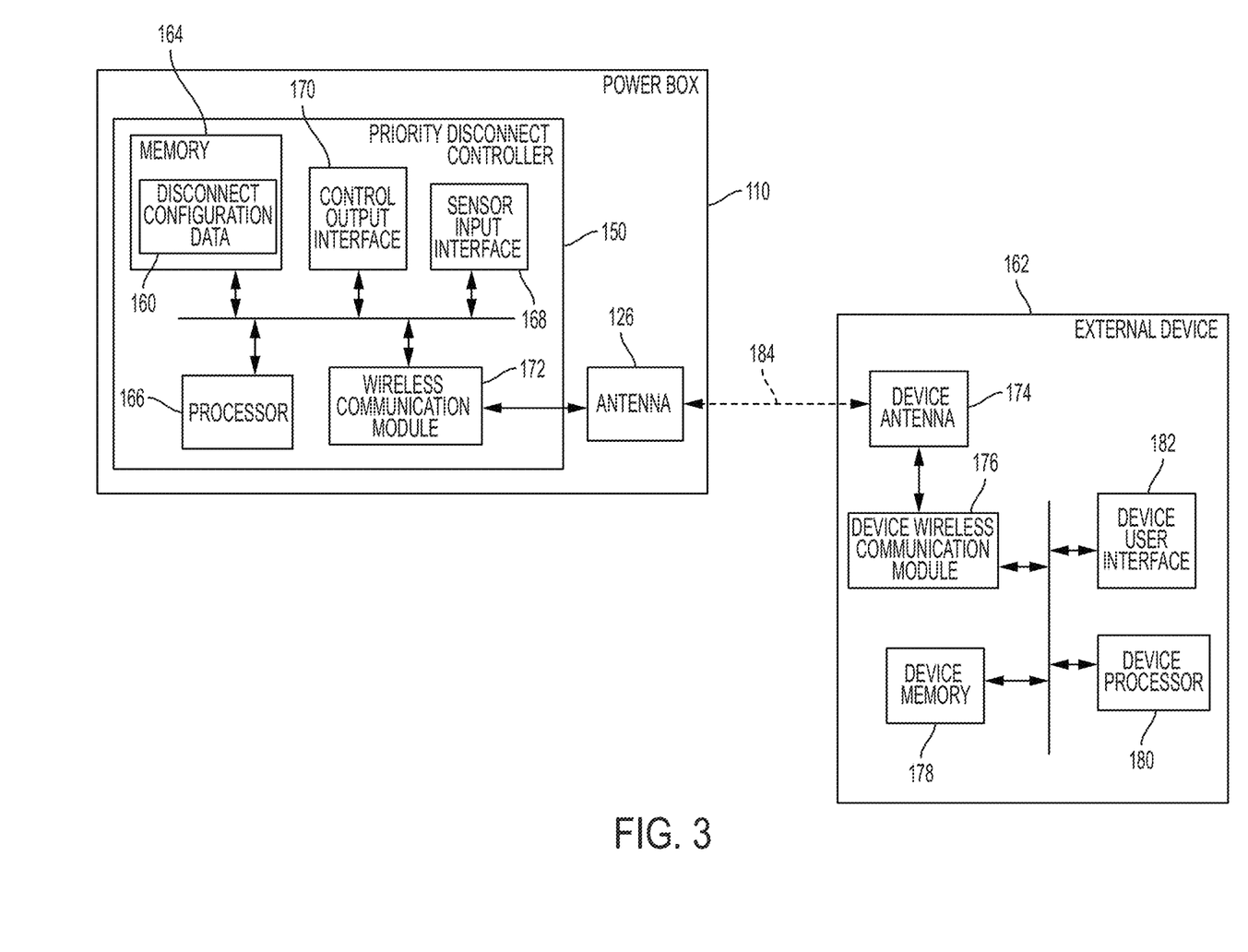
FIG. 3 illustrates a power box in communication with an external device according to embodiments of the invention.

As noted, the disconnect configuration of the PD controller 150 may define various current thresholds, a mode for each outlet circuit 140, and a priority level for each outlet circuit 140. With reference to FIG. 3, the disconnect configuration of the PD controller 150 may be defined by disconnect configuration data 160 wirelessly provided by an external device 162, also referred to as an external setting device 162. For instance, FIG. 3 illustrates the PD controller 150 including a memory 164, a processor 166, sensor input interface 168, control output interface 170, a wireless communication module 172, and a communication bus 173 allowing communication therebetween. The sensor input interface 168 includes a circuit interface (e.g., conductive pins) for connecting to and receiving data signals from the current sensors 152 and 153a-d. The sensor input interface 168 conditions and provides the received data signals to the processor 166. The control output interface 170 includes a circuit interface (e.g., conductive pins) for connecting to the disconnect switches 154a-d. The control output interface 170 conditions and provides control signals received from the processor 166 to the disconnect switches 154a-d.

The memory 164 stores data, such as the disconnect configuration data 160, and instructions for use by the processor 166 to carry out the functionality of the PD controller 150 described herein. For instance, the processor 166 may read software instructions from the memory 164 causing the processor 166 to compare current measurements obtained via the sensor input interface 168 to current thresholds of the disconnect configuration data 160, and to generate control signals that are provided to the disconnect switches 154a-d via the control output interface 170 according to the modes and priority levels of the outlet circuits 140 defined by the disconnect configuration data 160.

The wireless communication module 172 is coupled to the antenna 126 and enables the PD controller 150 to communicate with the external device 162. For instance, the wireless communication module 172 includes circuitry, such as buffers and data drivers, to enable communication via the antenna 126 with the external device 162 according to one or more communication protocols. The external device 162 is, for instance, a smart phone, tablet computer, laptop computer, desktop computer, personal digital assistant (PDA), or similar computing device.

The external device 162 includes a device antenna 174, a device wireless communication module 176, a device memory 178, a device processor 180, and a device user interface 182. The device wireless communication module 176, like the wireless communication module 172, includes circuitry, such as buffers and data drivers, to enable communication via the device antenna 174 with the power box 110. The wireless communication module 172 and antenna 126 selectively form a bidirectional, wireless communication link 184 with the device wireless communication module 176 and device antenna 174. The wireless communication module 172, the antenna 126, the device wireless communication module 176, and the device antenna 174 may communicate according to one or more communication protocols, such as the Bluetooth® protocol, the Wi-Fi® protocol, a near-field communication (NFC) protocol, or other protocols. In some embodiments, the wireless communication link 184 is a direct communication link that communicatively connects the antenna 126 and the device antenna 174 without intervening network devices, such as a router.

The device user interface 182 provides human perceptible outputs and receives human entered inputs allowing a user to interact with the external device 162. For instance, the device user interface 182 may include one or more of a touch screen display, hard key buttons (e.g., a key pad), a speaker, microphone, tactile feedback generators, or other components. The device memory 178 stores data and instructions for use by the device processor 180 to carry out the functionality of the external device 162 described herein. For instance, the device processor 180 may read software instructions from the device memory 178 causing the external device 162 to form the wireless communication link 184, to receive the disconnect configuration data 160 from the PD controller 150 over the wireless communication link 184, receive modifications for the disconnect configuration data 160 entered by the user via the device user interface 182, and send back the disconnect configuration data 160, as modified by the user, to the PD controller 150 over the wireless communication link 184.

Figure 4A:
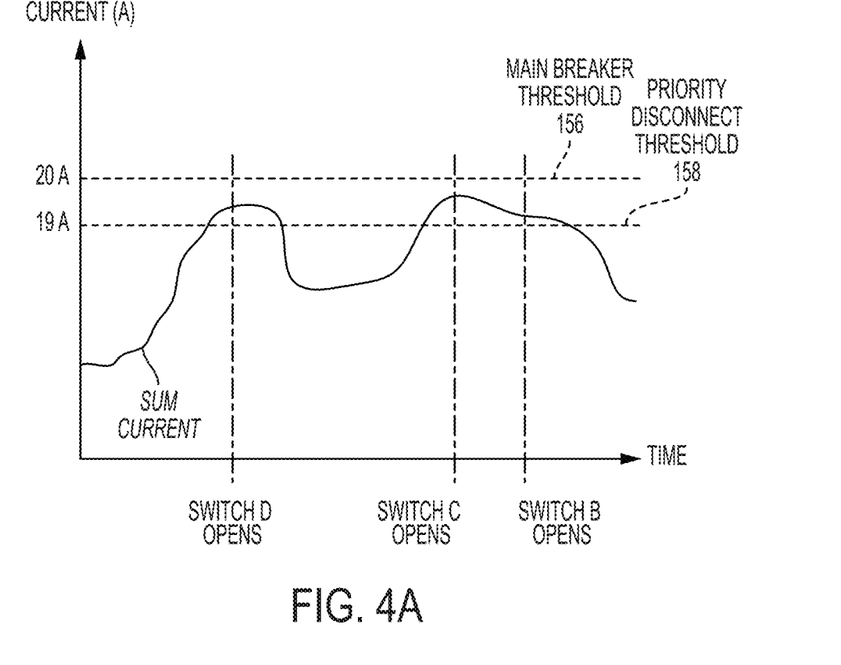
FIGS. 4A and 4B illustrates power box current graphs.

The disconnect configuration data 160 defines a priority level for each outlet circuit 140a-d. The PD controller 150 uses the priority levels to determine whether to open particular disconnect switches 154a-d. As an example, the disconnect configuration data 160 provides that the outlet circuit 140a has the highest priority level (priority 1), outlet circuit 140b has a lower priority level (priority 2), outlet circuit 140c has a lower priority level (priority 3), and outlet circuit 140d has the lowest priority level (priority 4). The PD controller 150 monitors the sum current drawn by the sum of the outlet circuits 140 using either the sum of the outputs of the current sensors 153a-d, or by using the current sensor 152. The PD controller 150 also has a predetermined priority disconnect threshold that is set to trigger before the main breaker 136 opens. For instance, FIG. 4A illustrates a graph of sum current over time, a main breaker threshold 156 of the main breaker 136, and the priority disconnect threshold 158. The main breaker threshold 156 is set at 20 A, while the priority disconnect threshold 158 is set at 19 A.

As shown in FIG. 4A, when the sum current first exceeds the priority disconnect threshold 158, the PD controller 150 determines which disconnect switch 154 has the lowest priority and opens that switch (e.g., disconnect switch 154d). In response, the sum current then drops below the priority disconnect threshold 158. Later, the sum current exceeds the priority disconnect threshold 158 again. The PD controller 150 determines which disconnect switch 154 of the remaining closed switches has the lowest priority (i.e., disconnect switch 154c). As the sum current remains above the priority disconnect threshold after opening disconnect switch 154c, the PD controller 150 determines and opens the remaining disconnect switch 154 having the lowest priority (i.e., disconnect switch 154b). The sum current then drops below the priority disconnect threshold, with only the disconnect switch 154a remaining closed.

Figure 4B:
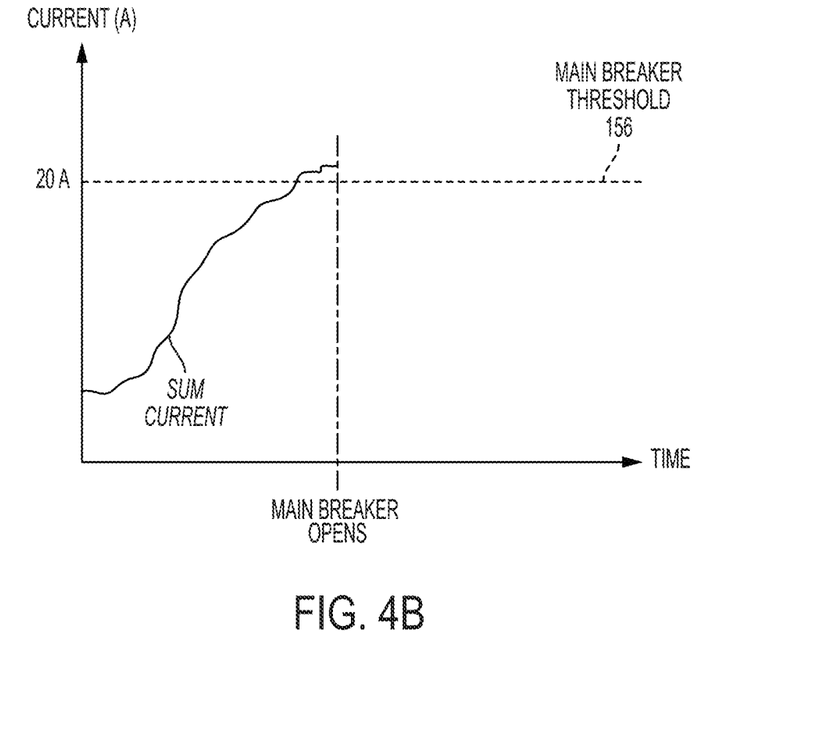

The PD controller 150 automatically disconnects outlet circuits 140 based on the set priority levels to keep the main breaker 136 from opening. Accordingly, a high priority tool or device (e.g., worksite lighting) coupled to a high priority outlet circuit 140, such as the outlet circuit 140a, remains powered. In contrast, the main breaker of a power box without the priority disconnect scheme or of the power box 110 having all outlet circuits 140 set to always-on mode (described below) would likely have opened, severing power to all devices connected to the power box 110 (see FIG. 4B).

The outlet circuits 140 can be assigned fewer or greater priority levels than four levels, as described above. For instance, the priority levels may include merely a low and high priority selection; a low, medium, and high priority level; or the same number of priority levels as outlet circuits 140.

Figure 5:
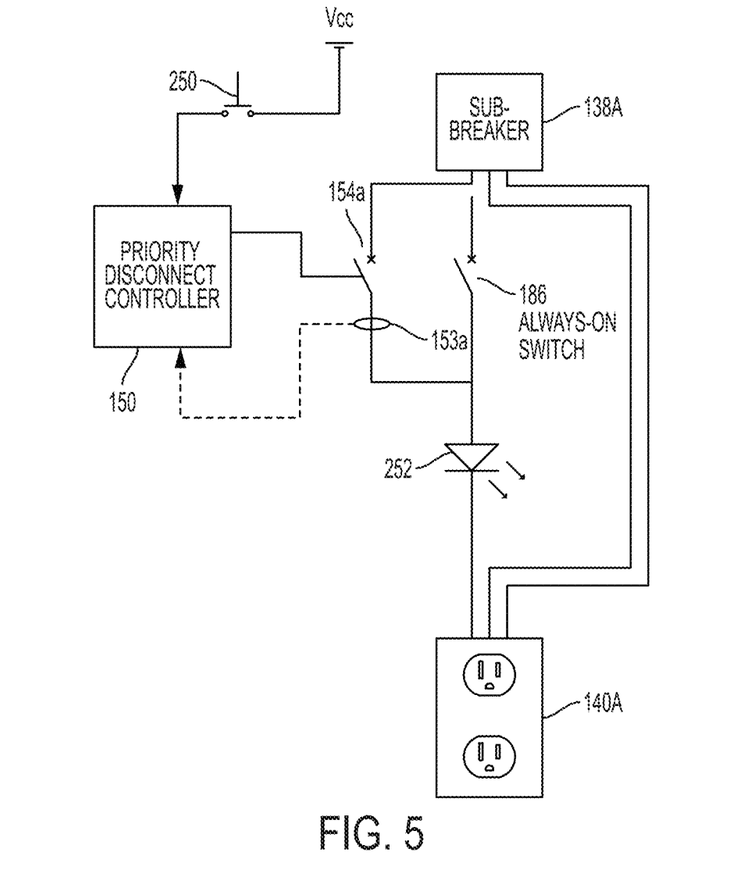
FIG. 5 illustrates a partial circuit diagram of a power box in accordance with embodiments of the invention.

As noted, the disconnect configuration data 160 may also define a mode for each outlet circuit 140. The mode may be either a priority disconnect mode or an always-on mode. The always-on mode is a mode in which the priority disconnect feature is disabled for the associated outlet circuit 140, and the priority disconnect mode is a mode in which the priority disconnect feature is enabled for an associated outlet circuit 140. As shown in FIG. 5, an always-on switch 186 provides a bypass conducting path that bypasses an associated disconnect switch 154a. FIG. 5 illustrates one of the outlet circuits 140 (the outlet circuit 140a) and associated circuitry for illustration purposes. However, the arrangement is similarly applicable to the other outlet circuits 140 present on the power box 110 to individually and selectively place the particular outlet circuits 140 in the always-on mode, as desired. With the bypass path, current is not interrupted to the outlet circuit 140 that is in the always-on mode even though the PD controller 150 may control the associated disconnect switch 154 to open.

In another embodiment, the always-on switch 186 is not included for each outlet circuit 140. Rather, when the always-on mode is selected for a particular outlet circuit 140, as defined by the disconnect configuration data 160, the PD controller 150 does not control the associated disconnect switch 154a-d to open. In the always-on mode, the breakers 136, 138 still provide circuit protection in the event of an over-current situation for an associated outlet circuit 140.

In some embodiments, the disconnect configuration data 160 defines the outlet circuits 140 as being in either an always-on mode or a low priority mode. When the priority disconnect threshold is exceeded, the PD controller 150 determines the current level of each of the low priority outlet circuits 140 and opens the disconnect switch associated with the highest current drawing outlet circuit 140.

Additionally, in some instances, two outlet circuits 140 (e.g., 140a and 140b) may have the same priority (e.g., priority 1). If two outlet circuits 140 have the same priority, the PD controller 150 may open both associated disconnect switches 154 when the PD controller 150 determines that (1) the priority disconnect threshold is exceeded and (2) the priority level of the two outlet circuits 140 are the lowest priority of the remaining outlet circuits 140 having closed disconnect switches. In some instances, if two outlet circuits 140 have the same priority and the priority disconnect threshold is exceeded, the PD controller 150 may determine which of the outlet circuits 140 has a larger current draw and open the disconnect switch 154 associated with that outlet circuit 140.

Figure 6:
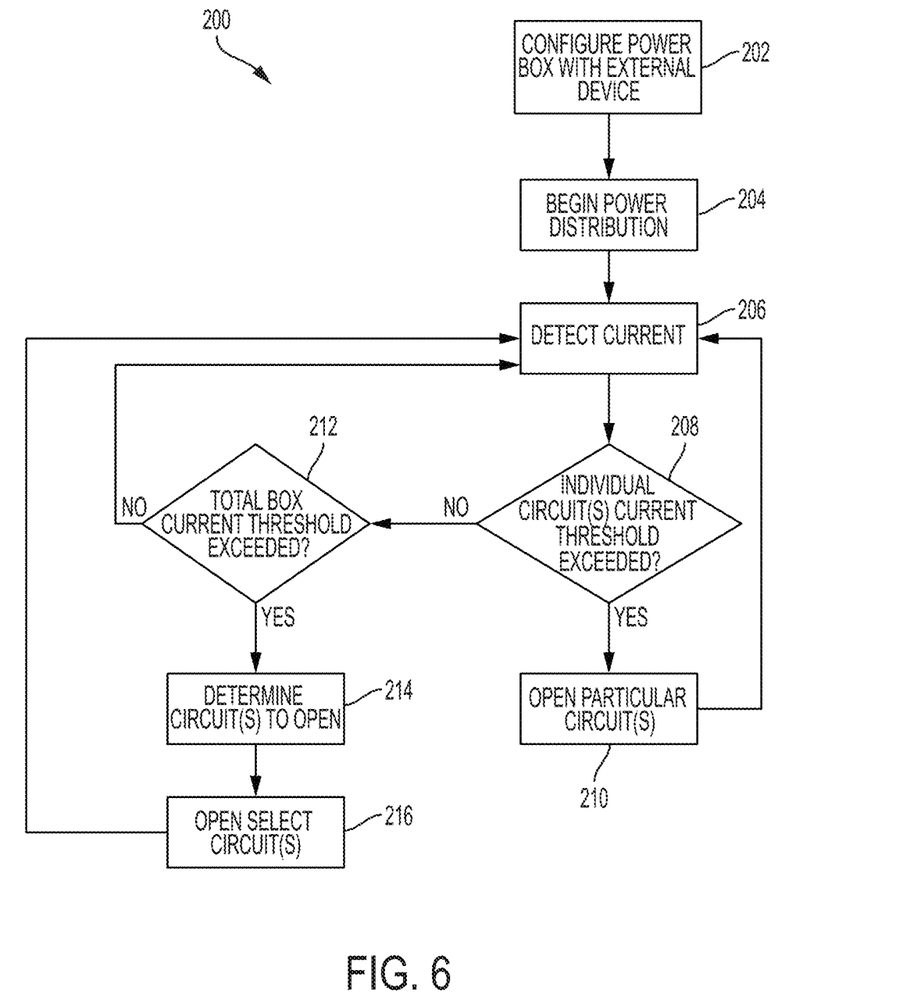
FIG. 6 illustrates a flow chart for implementing a priority disconnect on a power box in accordance with embodiments of the invention.

FIG. 6 illustrates a method 200 of implementing a priority disconnect scheme on the power box 110. In step 202, the external device 162 configures the power box 110. The configuration includes setting a priority level of each of the outlet circuits 140 and setting a mode of each of the outlet circuits 140 to be either in an always-on mode or a priority disconnect mode. In some instances, the outlet circuits 140 may have the mode setting feature or the priority setting feature, but not both. In such instances, step 202 includes configuring the feature that is present. Step 202 is described in further detail below with reference to FIGS. 7 and 8.

In step 204, the power box 110 distributes power after being coupled to the power source 102 and after having one or more devices coupled to the receptacles 142. One or both of steps 202 and 204 may be performed in a different order, simultaneously, and/or multiple times before reaching step 206.

In step 206, the PD controller 150 detects various current levels of the power box 110. For instance, the processor 166 monitors the outputs of the current sensors 152 and 153a-d. In step 208, the PD controller 150 determines whether an individual circuit current threshold of one of the outlet circuits 140 has been exceeded based on outputs of the current sensors 153a-d. If one or more individual circuit current thresholds have been exceeded, the PD controller 150 opens the disconnect switches 154a-d associated with the outlet circuit(s) 140a, 140b, 140c, and/or 140d having excessive current (step 210). If no individual circuit current thresholds have been exceeded, the PD controller determines whether the sum current, e.g., as detected by current sensor 152, has exceeded the priority disconnect threshold (step 212). If not, the PD controller 150 loops back to step 206 to again detect the current levels of the power box 110.

If the priority disconnect threshold has been exceeded, the PD controller 150 determines in step 214 which of the disconnect switches 154a-d to open based on the priorities and modes set in step 202. For instance, in step 214, the PD controller 150 determines which of the outlet circuits 140 has the lowest priority. Then, in step 216, the PD controller 150 controls the disconnect switches 154a-d associated with the determined, lowest priority outlet circuits to open. As described with respect to FIGS. 4A-B, the disconnect switch (es) 154 are opened to reduce the current drawn by the power box 110 to be below the priority disconnect threshold 158. If the opened disconnect switches 154 succeed in reducing the sum current, the power box 110 will continue to distribute power on the outlet circuits 140 that remain active with closed disconnect switches 154. The sum current may remain above the priority disconnect threshold even with an opened disconnect switch if, for instance, the particular outlet circuit 140 was in an always-on mode, or if the other outlet circuits 140 have high current levels. Accordingly, the PD controller 150 cycles back to step 206 to proceed back through steps of the method 200 to determine whether to open further disconnect switches. In some instances, if a user alters priority or mode settings during steps 204-216, the method 200 returns to step 202.

In some embodiments, in step 214, the PD controller 150 may also determine whether the outlet circuits 140 are in an always-on mode or a priority disconnect mode based on the disconnect configuration data 160. If one or more outlet circuit 140(s) are in an always-on mode, the PD controller 150 excludes those outlet circuit 140(s) from being considered as having the lowest priority level.

In some embodiments, the PD controller 150 determines which of the outlet circuits 140 having the lowest priority is drawing the most current in step 214. Then, in step 216, the PD controller 150 opens that high current outlet circuit 140.

The PD controller 150 may leave an opened disconnect switch of one of the outlet circuits 140 open until a user reset or for a predetermined amount of time (e.g., five seconds). For instance, FIG. 5 illustrates a portion of the power box 110 of FIG. 2 wherein the PD controller 150 includes a reset button 250 that indicates to the PD controller 150 to close the switch 154a. Alternatively, depressing the reset button 250 may manually close an associated disconnect switch or the external device 162 may send a reset signal, in response to user input, to close an opened disconnect switch.

The disconnect switches 154a-d may each be associated with indicator lights. The indicator lights may be, for example, light emitting diodes that are selectively illuminated to indicate the status of the associated disconnect switch 154a-d. For example, with reference to FIG. 5, if the disconnect switch 154a is closed, the associated indicator light 252 is activated to indicate to a user that the disconnect switch 154a is conducting and that the outlet circuit 140a is active. In other embodiments, the indicator lights are selectively controlled, e.g., by the PD controller 150, to illuminate when an associated disconnect switch 154a-d has been opened. In some embodiments, the indicator lights (e.g., indicator light 252) is selectively controlled, e.g., by the PD controller 150, to indicate when current of one of the outlet circuits 140 is approaching its individual circuit current threshold based on outputs of the current sensors 153a-d. For example, the PD controller 150 may control the associated indicator light 252 associated with the particular outlet circuit 140 to flash or be illuminated in a warning color (e.g., yellow). Accordingly, the PD controller 150 is operable to control the indicator light 252 of each outlet circuit 140 to change between multiple operating states to indicate whether the outlet circuit 140 is conducting, whether the outlet circuit 140 is approaching its individual circuit current threshold, and whether the associated disconnect switch 154a-d has been opened.

In some embodiments, additionally or alternatively, the PD controller 150 controls the indicator light 252 (or both the indicator light 252 and indicator lights associated with the other outlet circuits 140) to indicate when the sum current of the outlet circuits 140 is approaching the priority disconnect threshold 158 based on outputs of the current sensors 153a-d. For example, the PD controller 150 may control one or more of the indicator lights to flash or be illuminated in a warning color (e.g., yellow). To determine whether current is approaching a threshold (e.g., the individual circuit current threshold or the priority disconnect threshold 158), the PD controller 150 may compare output of the current sensors 153a-d to a threshold that is lower (e.g., by 5%) than the associated threshold.

In some embodiments, the PD controller 150 provides a notification to the external device 162 upon controlling one of the disconnect switches 154a-d to open. For example, the notification may include an identity of the power box having the opened one or more disconnect switches 154a-d and an identity of each of the disconnect switches 154a-d that are opened, which are then displayed on and/or audibly conveyed by the external device 162. Such notifications may be provided, for example, upon opening one or more of the disconnect switches 154a-d in steps 216 and 210 of method 200.

In some embodiments, the PD controller 150 may be coupled to breaker sensors (not shown) for each of the main breaker 136 and sub-breakers 138a-d operable to indicate to the PD controller 150 the state of the associated breaker (e.g., closed or open/tripped). The PD controller 150 detects when the main breaker 136 trips and when one or more of the sub-breakers 138a-e trips, and provides a notification to the external device 162 upon such detection. For example, the notification may include an identity of the power box having the tripped breaker and an identity of the detected breaker that tripped, which are then displayed on and/or audibly conveyed by the external device 162.

Figure 7:
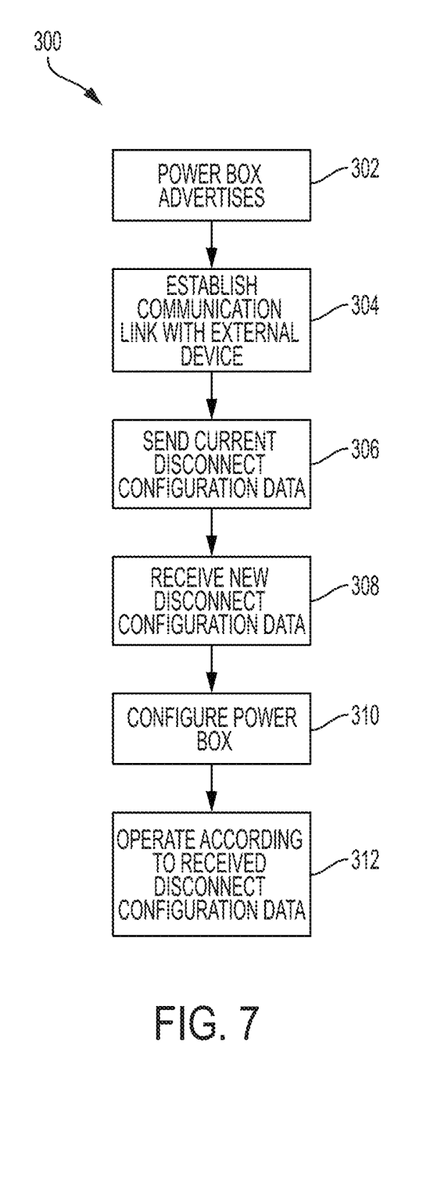
FIG. 7 illustrates a flow chart for configuring a power box using an external device in accordance with embodiments of the invention.

FIG. 7 illustrates a method 300 of configuring the power box 110 using the external device 162. The method 300 may be implemented to effect step 202 of FIG. 6. In step 302, the power box 110 advertises or periodically broadcasts an advertisement message, which is received by the external device 162 when in range. The advertisement message includes identification information regarding the power box 110 identity (e.g., serial number, a user assigned identifier or another unique identifier).

In step 304, the power box 110 establishes a communication link (e.g., the wireless communication link 184) with the external device 162. Establishing the communication link may include an exchange of messages (e.g., handshake) including identifying information for the power box 110 and the external device 162, communication characteristics (e.g., timing and/or frequency information for communications), and other data.

After establishing the communication link, the power box 110 sends the disconnect configuration data 160 presently stored in the memory 164 (current disconnect configuration data) to the external device 162 (step 306). In step 308, the power box 110 receives new disconnect configuration data from the external device 162. In step 310, to configure the power box 110, the power box 110 stores the received disconnect configuration data in the memory 164 as the disconnect configuration data 160, overwriting the previous configuration data. Accordingly, through step 310, the PD controller 150 has priority levels, modes, or both (e.g., in the memory 164) assigned to the outlet circuits 140, as specified by the received disconnect configuration data. In step 312, the power box operates according to the disconnect configuration data 160 newly received and stored. For instance, for step 312, the power box 110 may implement steps 204-216 as described above with respect to FIG. 6.

Figure 8:
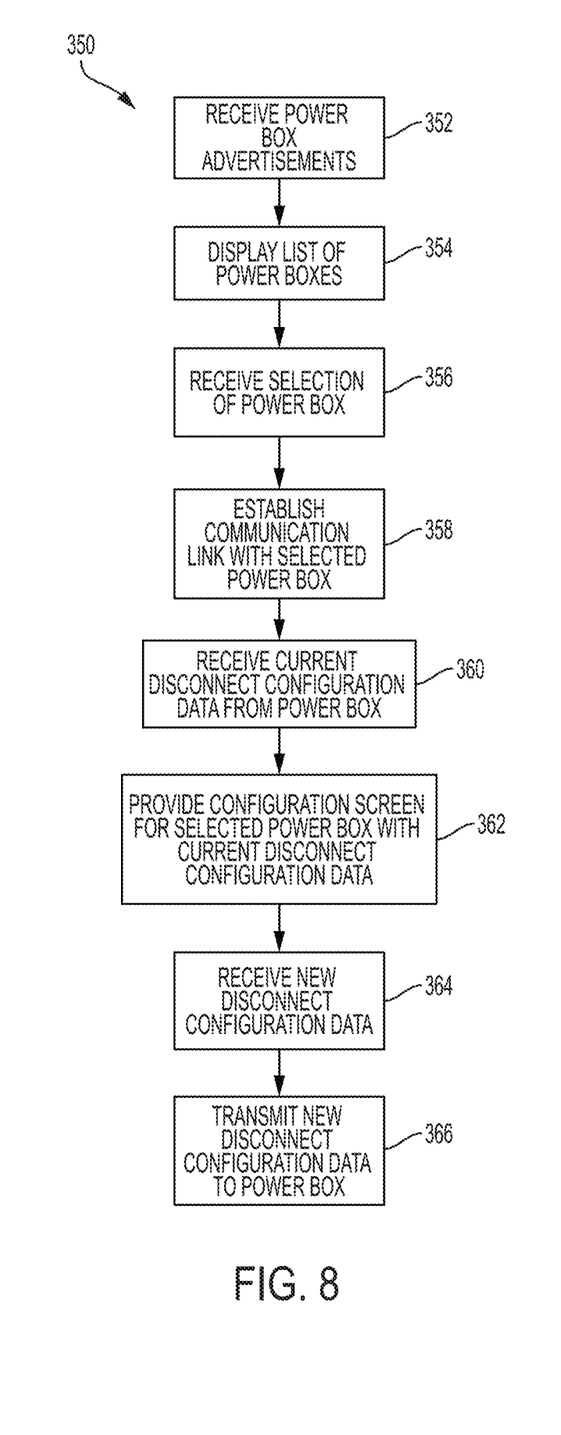
FIG. 8 illustrates another flow chart for configuring a power box using an external device in accordance with embodiments of the invention.

FIG. 8 illustrates a method 350 of configuring the power box 110 using the external device 162. The method 350 may also be implemented to effect step 202 of FIG. 6. In step 352, the external device 162 receives an advertisement message broadcast by the power box 110. Also in step 352, the external device 162 may receive additional advertisement messages from other power boxes 110 or from other power tool devices (e.g., an electric drill/driver 114, circular saw 117, or power tool battery packs). The advertisement messages are received by the device wireless communication module 176 via the device antenna 174. The external device 162 determines one or more of the specific make, model, and serial number of devices that transmitted the advertisement messages, including the power box 110. In step 354, the external device 162 displays a list of devices from which advertisement messages were received, including the power box 110. For instance, the list of devices is generated by the device processor 180 and shown on a touch screen of the device user interface 182. In step 356, the external device 162 receives a user selection of the power box 110 from the list of devices via the device user interface 182.

In step 358, in response to receiving the user's selection, the external device 162 establishes a communication link with the power box 110, as described with respect to step 304 of FIG. 7. In step 360, the external device 162 receives the current disconnect configuration data from the power box 110, transmitted by the power box 110 as described with respect to step 306.

In response, in step 362, the external device 162 generates a configuration screen for the power box 110, which is displayed on the device user interface 182. The configuration screen illustrates outlet circuits 140 of the power box 110 that are configurable and one or more of the current priority levels of the outlet circuits 140, the mode of the outlet circuits 140, and current thresholds of the power box 110. Via the device user interface 182, in step 364, the external device 162 receives user input to adjust the settings of the disconnect configuration data on the configuration screen and, thereby, generate new disconnect configuration data. For instance, the external device 162 receives user input to modify one or more of a priority level for each outlet circuit 140, a mode (e.g., always-on or priority disconnect) for each outlet circuit 140, and a current threshold for each outlet circuit 140. Thus, a user may modify settings for each outlet circuit 140, or opt to modify only those settings desired, such as the priority level of two outlet circuits 140 and the mode of another outlet circuit 140. In the latter instance, the new disconnect configuration data would then be a combination of configuration settings from the disconnect configuration data received from the power box 110 and new user input received in step 364.

In step 366, the external device 162 transmits the new disconnect configuration data to the power box 110. The power box 110 receives the new disconnect configuration data and is configured and operated accordingly, as described with respect to steps 308, 310, and 312.

In some instances, steps 306 and 360 are bypassed in the methods 300 and 350, respectively, and the external device 162, in step 362, presents default settings rather than current configuration settings of the power box 110. In some embodiments, method 300 of FIG. 7 is executed by the power box 110 and method 350 of FIG. 8 is executed by the external device 162 to effect configuring of the power box 110.

Figure 9:
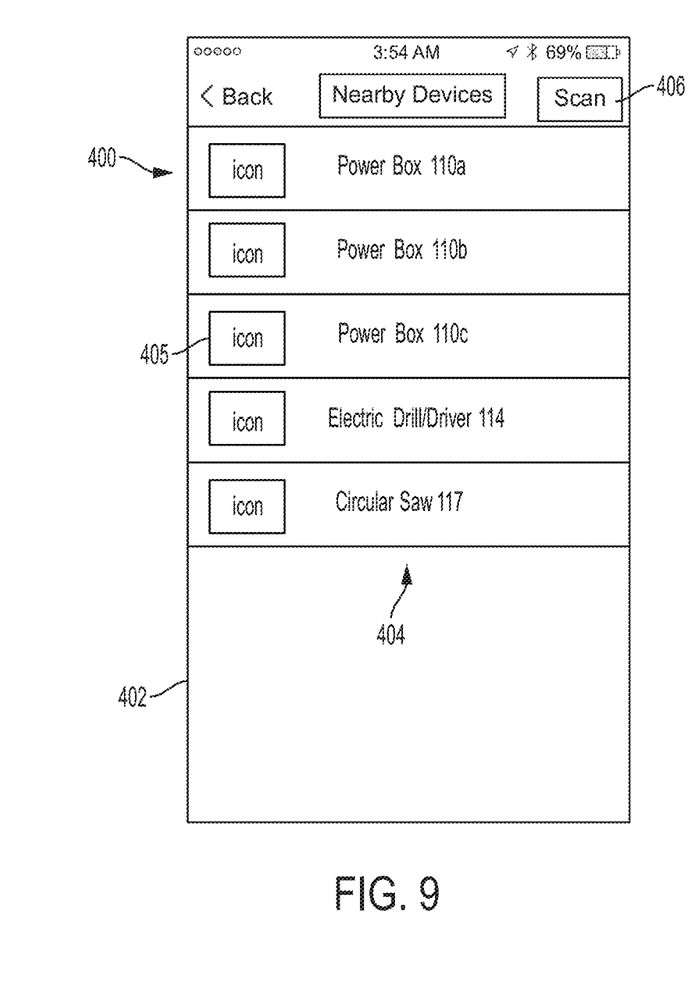
FIGS. 9-10 illustrate graphical user interfaces implemented on an external device and used to configure a power box in accordance with embodiments of the invention.
Figure 10:
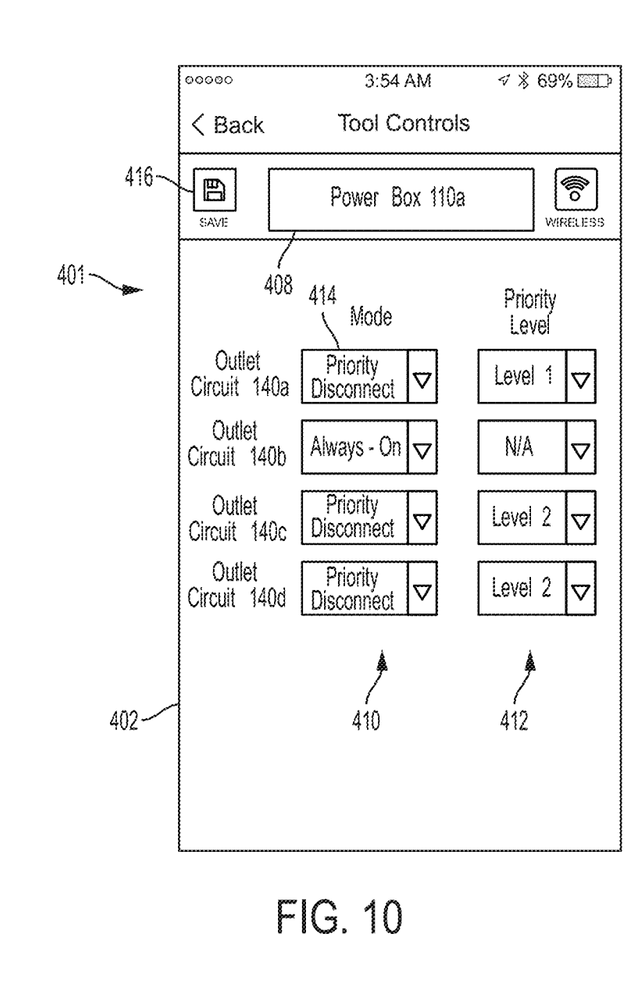

FIGS. 9 and 10 illustrate graphical user interfaces 400 and 401, respectively, that are implemented by the external device 162. The graphical user interfaces 400 and 401 are shown on a touch screen display 402 of the external device 162 and generated by the device user interface 182 in conjunction with the device processor 180. More particularly, the graphical user interface 400 displays a list of nearby devices 404. Each device on the list of nearby devices 404 includes an identifier (e.g., "Power Box 110a") and an icon 405. The icon 405 may be a visual representation or image of the device. The list may be generated as a result of step 354 described with respect to FIG. 8. Receipt of a scan command via a user input on the scan button 406 causes the external device 162 to broadcast a polling message, to which nearby devices respond with an advertisement message. In some instances, the devices periodically broadcast advertisement messages without prompting by the external device 162.

Each item in the list is a device that is selectable by the user via the graphical user interface 400. Selection of one of the nearby devices leads to forming a communication link with the selected device (see, e.g., steps 356 and 358). Selection of a device also results in generation of a new screen on the touch screen display 402 for configuring or displaying data from the selected device (see, e.g., steps 360 and 362). For instance, the external device 162 may receive a user selection of the power box 110a via the graphical user interface 400. In response, the external device 162 generates the graphical user interface 401 for display on the touch screen display 402, as shown in FIG. 10.

The graphical user interface 401 includes an identification of the selected device (device ID) 408 and, initially, displays the current configuration settings of the selected device. For instance, in the illustrated example, the power box 110a includes four configurable outlet circuits 140a-d, each with a configurable mode and priority level. The external device 162 receives the current disconnect configuration data from the power box 110 (step 360) and displays the current mode and priority levels for each outlet circuit 140a-d in a mode display portion 410 and a priority level display portion 412 (step 362). As shown, the outlet circuit 140a is set to the priority disconnect mode with a priority level of 1, while the outlet circuit 140b is set to the always-on mode and the priority level is not applicable. In the illustrated graphical user interface 401, a drop down menu is provided for each configurable mode and priority level, enabling a user to adjust the mode and priority level for each outlet circuit 140a-d. In other embodiments, radio buttons and other selectors are provided to enable setting the mode and priority levels.

When a user changes the settings by manipulating the drop down menus (e.g., mode menu 414), the external device 162 is receiving new configuration data (see step 364). The new configuration data may be sent automatically to the power box 110a upon each change or transmission of the new configuration data to the power box 110a may occur after receiving a user selection of the save button 416. While FIG. 10 is described with respect to the power box 110a for illustrative purposes, similar graphical user interfaces are provided in response to a user selection of the other power boxes 110b and 110c. Additionally, the graphical user interfaces 400 and 401 are merely exemplary, as other user interfaces of the external device 162 may be used to convey and/or receive user settings that form the disconnect configuration data for the power boxes 110.

Furthermore, the external device 162 may obtain and display power data captured and output by the priority disconnect controller 150. For instance, the processor 166 may capture power data including power consumption data and quality of power data from sensor input interface 168 and store the power data in the memory 164. The stored power data may be output to the external device 162 in response to a request from the external device 162 based on a user input or may be output periodically (e.g., once an hour, day, week, or month). The power consumption data may indicate the amount of power consumed by loads attached to the power box 110 either in total or per outlet circuit 140.

While the embodiments above describe a wireless communication link 184 formed between the external device 162 and the power box 110 to effect configuration of the power box 110, in some embodiments, a wired connection is provided. For instance, in place of or in addition to the wireless communication module 172 and antenna 126, the power box 110 includes a wired communication module and a wired communication port. Similarly, the external device 162 includes a device wired communication module and a device wired communication port. A communication cable is connected to the wired communication port and the device wired communication port to form a wired communication link. The wired communication link and related components may provide wired communications according to various communication protocols, such as the universal serial bus (USB®) protocol, Firewire® protocol, RS-232 protocol, and others. The methods 300 and 350 similarly apply, with some modification for the wired, rather than wireless approach. For instance, steps 352, 354, and 356 may be bypassed as a direct connection between the power box 110 and the external device 162 can serve as the selection of the power box 110.

Thus, the invention provides, among other things, systems and methods for configuring a power distribution box having priority disconnects and used to distribute temporary power. Various features and advantages of the invention are set forth in the following claims.

What is claimed is:

1. A power distribution system comprising:
   a power distribution box including:
      a plurality of power outlets,
      a plurality of current draw indicators associated with the plurality of power outlets,
      a plurality of outlet circuits associated with the plurality of power outlets, each of the plurality of outlet circuits corresponding to one of the plurality of power outlets,
      a first wireless communication module, and
      a first controller configured to:
         assign a priority level to each of the plurality of outlet circuits as specified by disconnect configuration data,
         monitor current drawn by an outlet circuit selected from the plurality of outlet circuits, and
         indicate, using the plurality of current draw indicators, an amount of current drawn by the outlet circuit selected from the plurality of outlet circuits; and
   an external device including:
      a second wireless communication module, and
      a second controller connected to the second wireless communication module, the second controller configured to establish a wireless communication link with the first wireless communication module of the power distribution box using the second wireless communication module and based on a user selection.

2. The power distribution system of claim 1, wherein the second controller of the external device is configured to establish the wireless communication link with the first wireless communication module according to Bluetooth® protocol, Wi-Fi® protocol, or a near-field communication (NFC) protocol.

3. The power distribution system of claim 2, wherein, to establish the wireless communication link, the second controller is configured to:
   receive an advertisement message from one or more power distribution boxes in advance of establishing the wireless communication link, and
   display the one or more power distribution boxes in response to receiving the advertisement message.

4. The power distribution system of claim 1, wherein the plurality of current draw indicators includes a device current draw indicator configured to indicate a sum amount of current drawn by all of the power outlets in the plurality of power outlets.

5. The power distribution system of claim 4, wherein:
   the current draw indicators are indicator lights; and
   the first controller is further configured to change an illumination color of the indicator lights to indicate a current drawn by the plurality of outlet circuits.

6. The power distribution system of claim 1, wherein the first controller is further configured to:
   communicate, to the external device, a disconnect status of a switch connected to the outlet circuit selected from the plurality of outlet circuits.

7. The power distribution system of claim 6, wherein the first controller is further configured to:
   open or close the switch connected to the outlet circuit selected from the plurality of outlet circuits based on a signal received from the external device.

8. A method of controlling a power distribution box including a plurality of outlet circuits, the method comprising:
   assigning, using a controller of the power distribution box, priority levels to the plurality of outlet circuits as specified by disconnect configuration data;
   monitoring, using the controller, current drawn by an outlet circuit selected from the plurality of outlet circuits; and
   indicating, using one or more current draw indicators, an amount of current drawn by the outlet circuit selected from the plurality of outlet circuits.

9. The method of claim 8, further comprising:
   establishing a wireless communication link with an external device according to Bluetooth® protocol, Wi-Fi® protocol, or a near-field communication (NFC) protocol.

10. The method of claim 9, wherein establishing the wireless communication link includes:
    receiving an advertisement message from the power distribution box in advance of establishing the wireless communication link; and
    displaying the power distribution box in response to receiving the advertisement message.

11. The method of claim 8, wherein the one or more current draw indicators include a device current draw indicator for indicating a sum amount of current drawn by all of the plurality of outlet circuits.

12. The method of claim 11, wherein the one or more current draw indicators are indicator lights; and the method further comprising changing an illumination color of the indicator lights for indicating a current drawn by the plurality of outlet circuits.

13. The method of claim 8, further comprising:
communicating, to an external device, a disconnect status of a switch connected to the outlet circuit selected from the plurality of outlet circuits.

14. The method of claim 13, further comprising:
opening or closing the switch connected to the outlet circuit selected from the plurality of outlet circuits based on a signal received from the external device.

15. A power distribution box comprising:
a plurality of power outlets;
a plurality of current draw indicators associated with the plurality of power outlets;
a plurality of outlet circuits associated with the plurality of power outlets; and
a controller configured to:
    assign a priority level to each of the plurality of outlet circuits as specified by disconnect configuration data,
    monitor current drawn by an outlet circuit selected from the plurality of outlet circuits, and
    indicate, using the plurality of current draw indicators, an amount of current drawn by the outlet circuit selected from the plurality of outlet circuits.

16. The power distribution box of claim 15, wherein the plurality of current draw indicators includes a device current draw indicator configured to indicate a sum amount of current drawn by all of the power outlets in the plurality of power outlets.

17. The power distribution box of claim 15, wherein:
the current draw indicators are indicator lights; and
the controller is further configured to change an illumination color of the indicator lights to indicate a current drawn by the plurality of outlet circuits.

18. The power distribution box of claim 15, wherein the controller is further configured to:
communicate, to an external device, a disconnect status of a switch connected to the outlet circuit selected from the plurality of outlet circuits.

19. The power distribution box of claim 18, wherein the controller is further configured to:
open or close the switch connected to the outlet circuit selected from the plurality of outlet circuits based on a signal received from the external device.

20. The power distribution box of claim 15, wherein:
the disconnect configuration data specifies a mode of each of the plurality of outlet circuits; and
the mode is one of an always-on mode, in which a priority disconnect operation is disabled, and a priority disconnect mode, in which the priority disconnect operation is enabled.

\* \* \* \* \*